Aug. 6, 1968                D. B. COFER ET AL                3,395,560
                     APPARATUS FOR AND PROCESS OF COILING RODS
Filed June 15, 1964                                    6 Sheets-Sheet 2
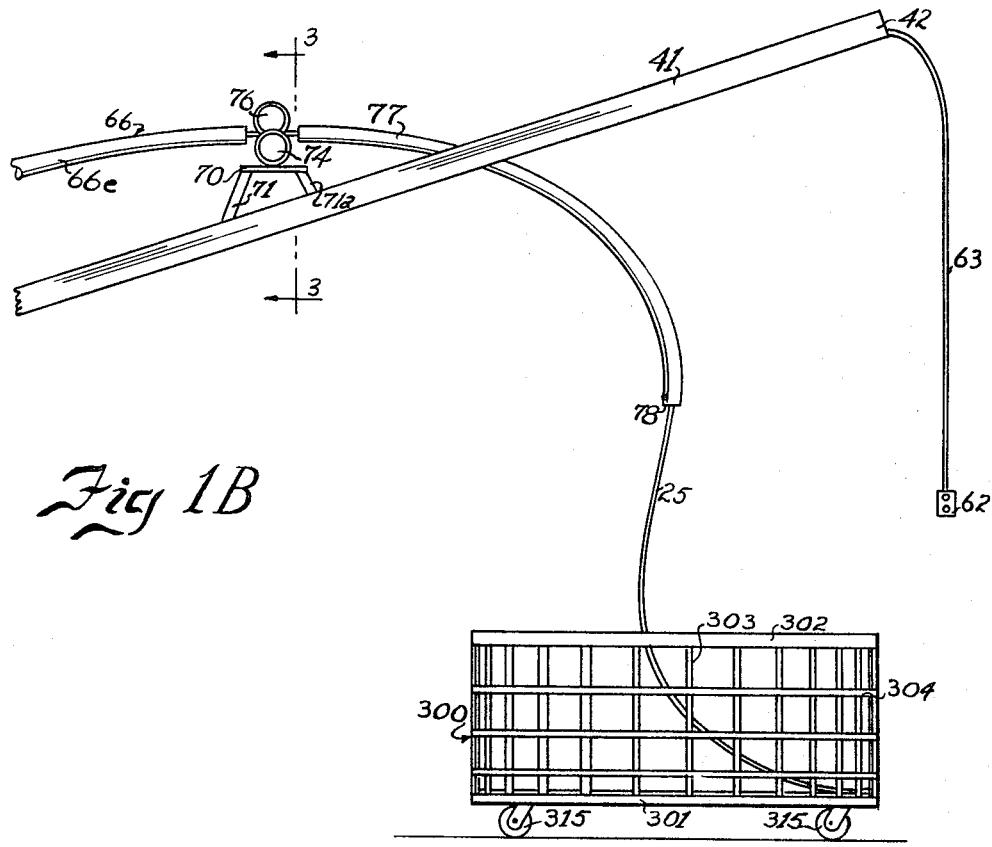
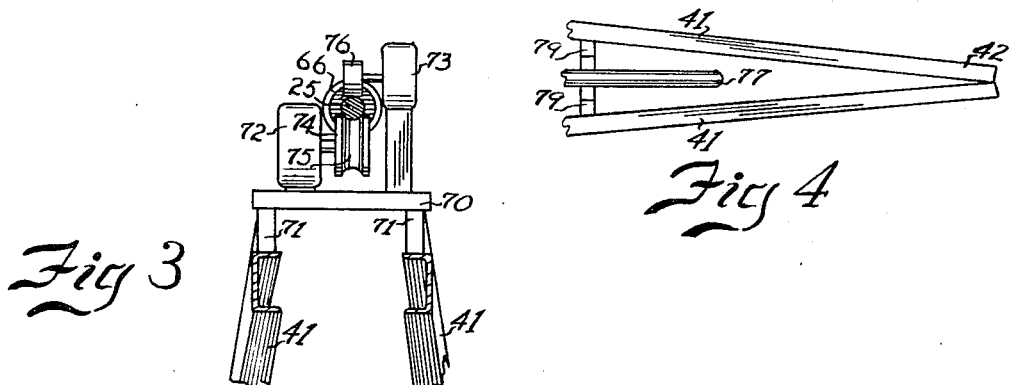
INVENTOR.
DANIEL B. COFER
GEORGE C. WARD
BY
Newton, Hopkins & Jones
ATTORNEYS

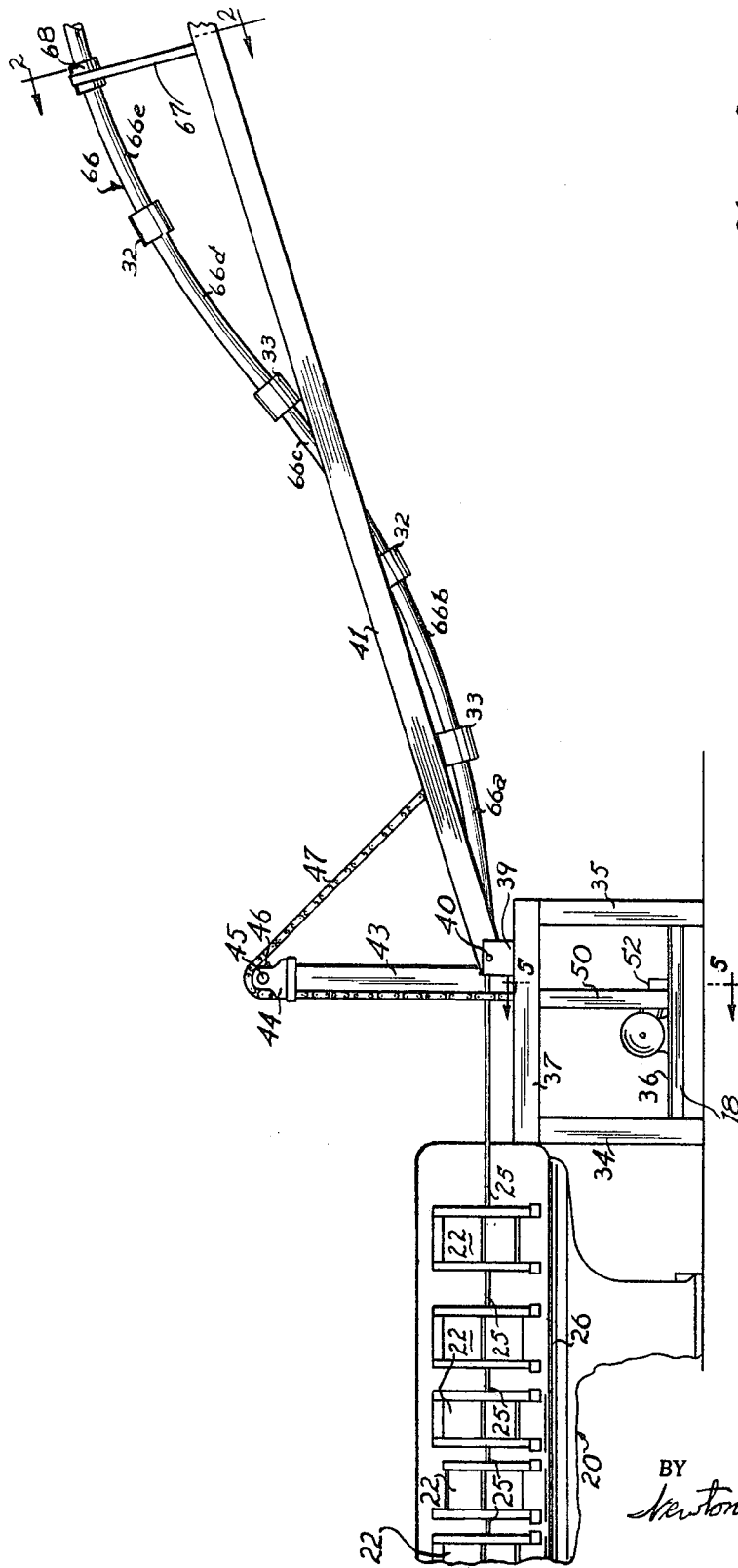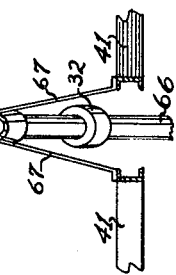

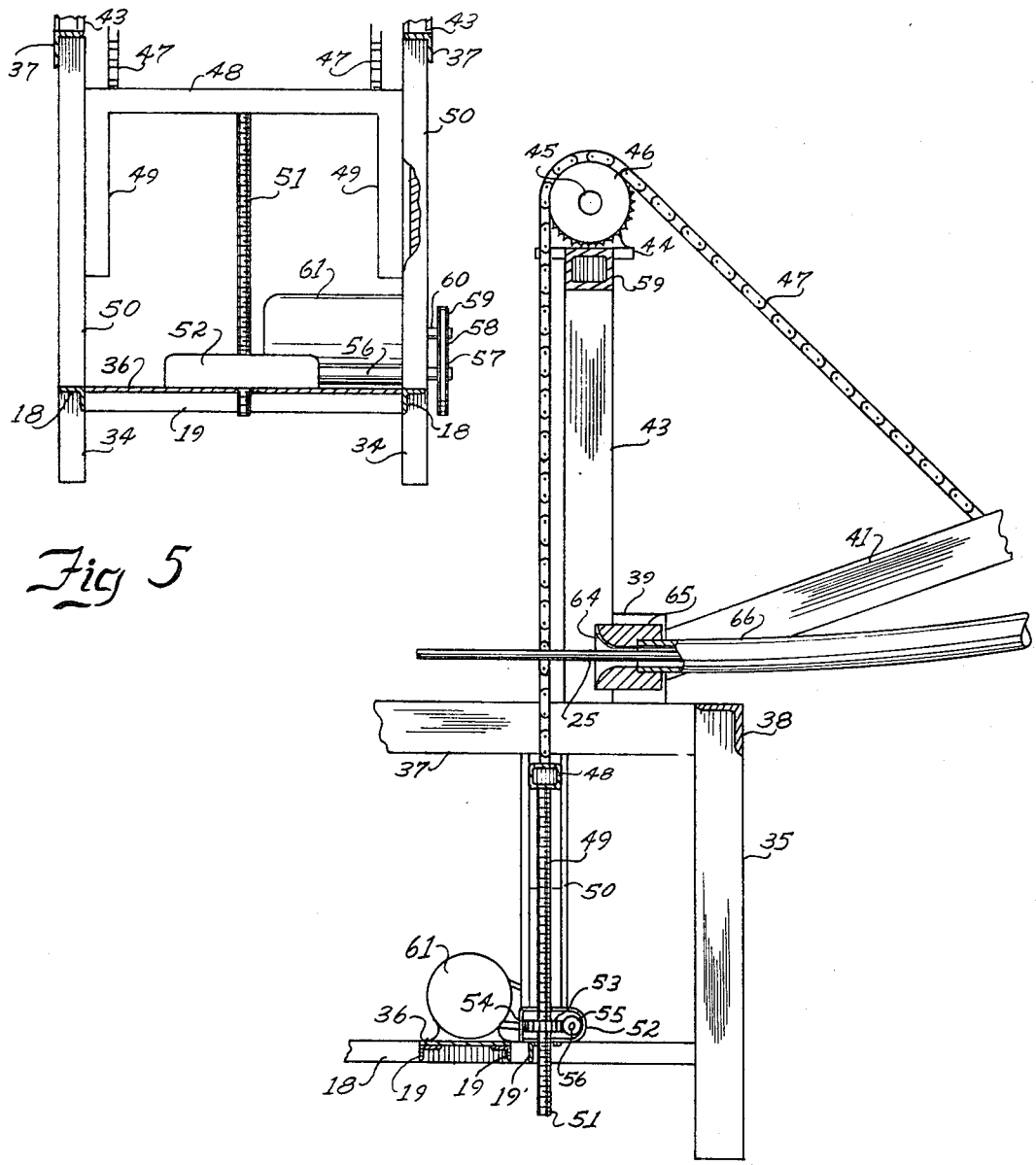

Aug. 6, 1968   D. B. COFER ET AL   3,395,560
APPARATUS FOR AND PROCESS OF COILING RODS
Filed June 15, 1964   6 Sheets-Sheet 4
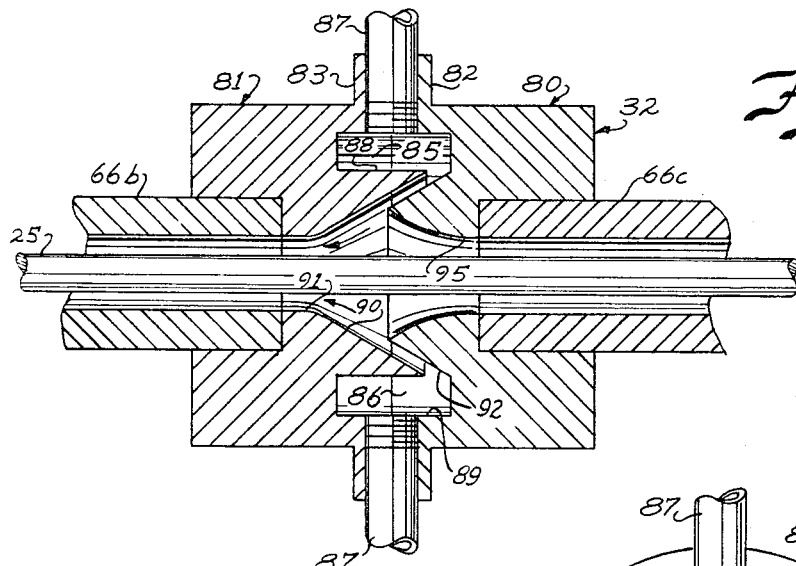
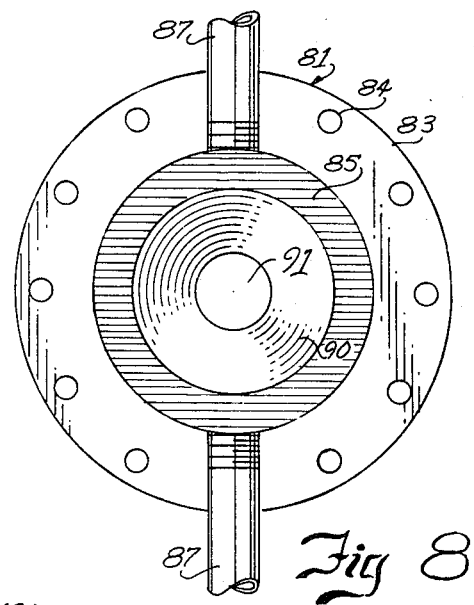
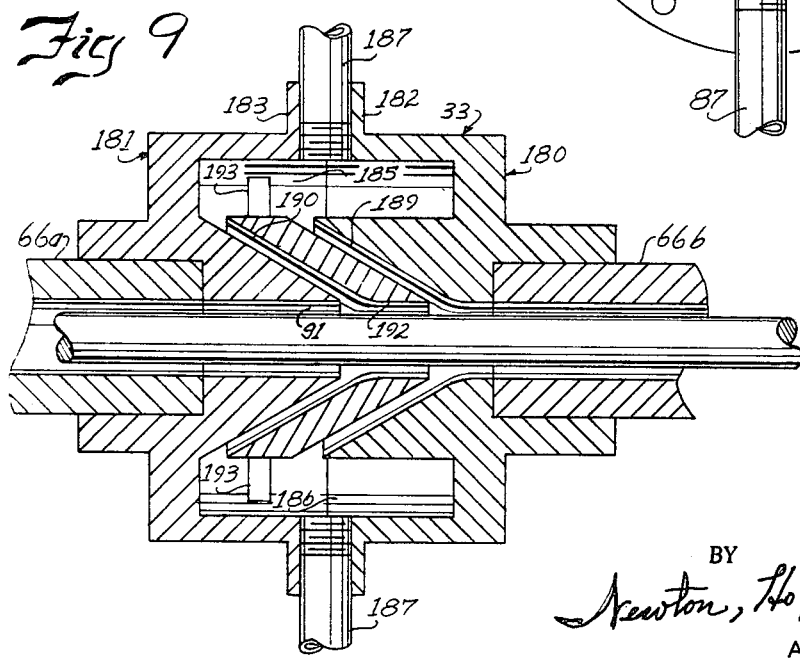
INVENTOR.
DANIEL B. COFER
GEORGE C. WARD
BY
Newton, Hopkins & Jones
ATTORNEYS

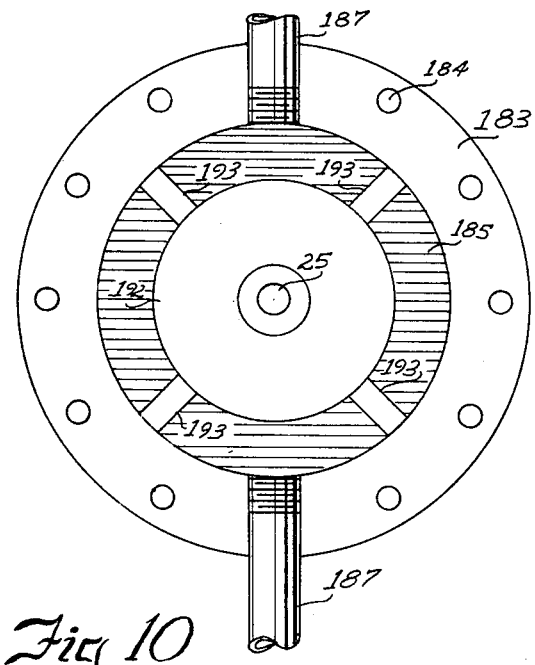
Fig 10
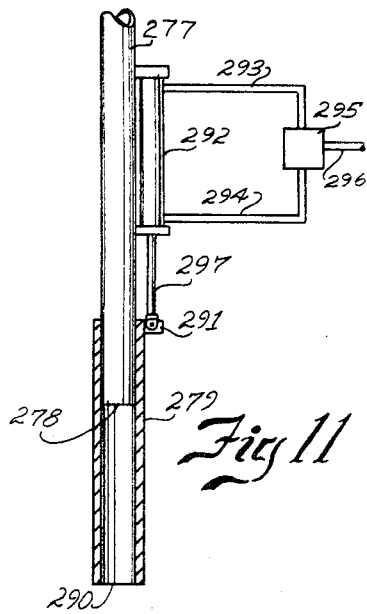
Fig 11
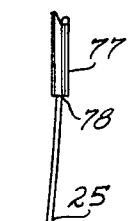
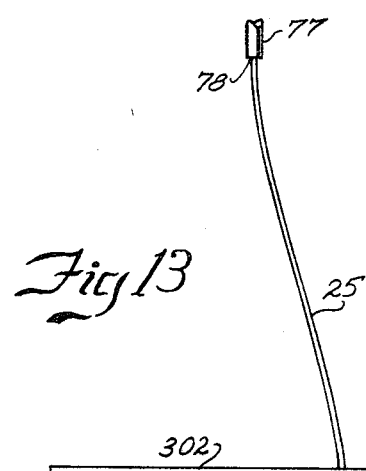
Fig 12
Fig 13
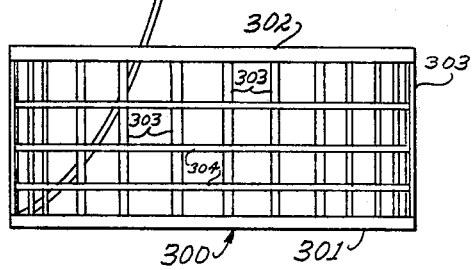
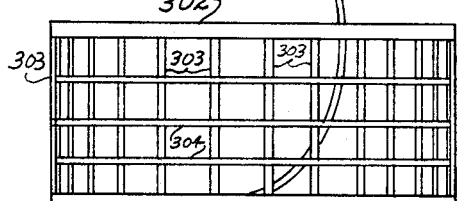
INVENTOR.
DANIEL B. COFER
GEORGE C. WARD
BY Newton, Hopkins & Jones
ATTORNEYS

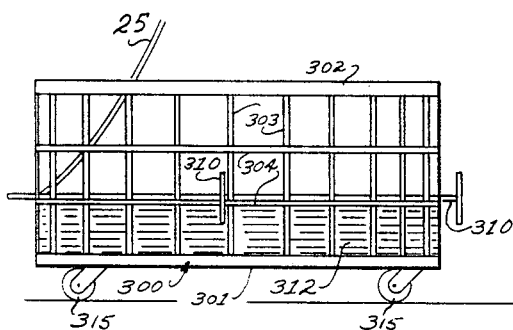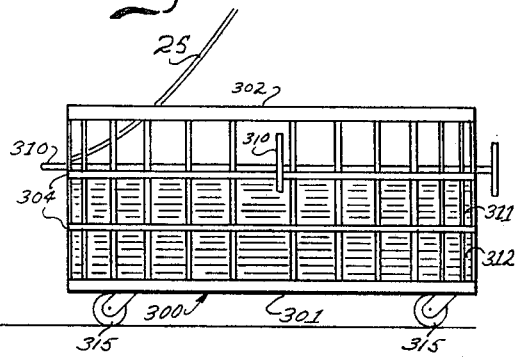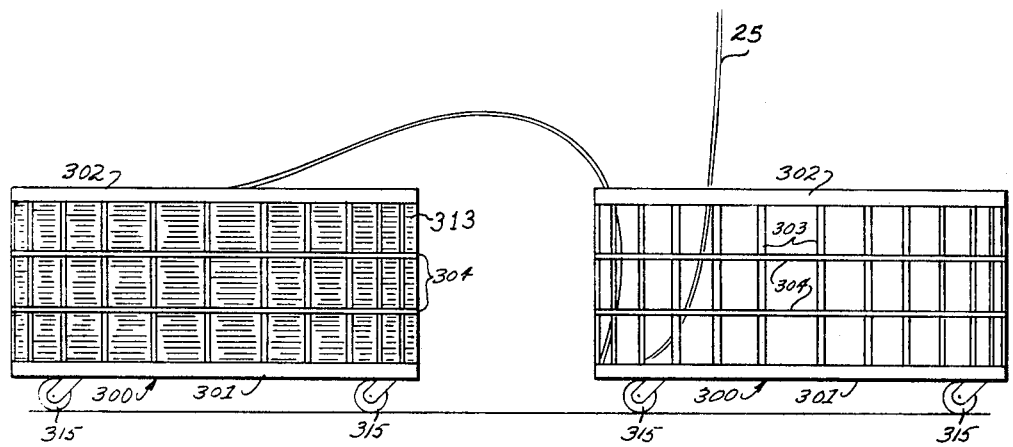

ced Aug. 6, 1968

3,395,560
APPARATUS FOR AND PROCESS OF
COILING RODS
Daniel B. Cofer and George C. Ward, Carrollton, Ga.,
assignors to Southwire Company, Carrollton, Ga., a
corporation of Georgia
Filed June 15, 1964, Ser. No. 375,399
21 Claims. (Cl. 72—66)

ABSTRACT OF THE DISCLOSURE

What is disclosed herein is an apparatus for and a method of coiling rod as it passes continuously from a hot-forming means such as a rolling mill. The apparatus and method disclosed involve directing the rod along an arcuate path into a vertical path which terminates at a point above a receptacle while cooling the rod, and increasing and decreasing the distance of the point from a support surface in the receptacle so as to increase and decrease the diameters of convolutions of the rod in the receptacle. Devices for applying coolant to and removing coolant from the rod are also disclosed.

---

This invention relates to apparatus for and a process of coiling elongated tubular material and is more particularly concerned with apparatus for and a method of coiling metal rods of substantially any desired length and at substantially any desired initial temperature.

In the production of wire, the wire is customarily formed by passing a metal rod through a wire forming machine. It is desirable that the wire formed by the wire forming machine be substantially continuous so that wires of various selected lengths can be obtained simply by cutting the continuous wire after selected lengths of the continuous wire have been formed. As a result, it is customary to feed a wire forming machine with a substantially continuous rod so that wire is continuously formed.

The substantially continuous rod customarily fed to a wire forming machine is usually obtained by welding rods of various relatively short lengths end to end as these rods are fed consecutively into the wire forming machine. This welding of rods to form joints between consecutive rods is time consuming and requires the efforts of a skilled artisan. Moreover, the welding of joints to obtain a substantially continuous rod frequently causes wire formed from the rod to be weakened or otherwise structurally defective in those portions corresponding to the joints at which the rods have been welded together. Accordingly, numerous efforts have been made in the past to provide rods of substantial length so as to reduce the number of welding operations required to obtain the rods necessary for wires of various lengths.

These efforts have resulted in rods of ever increasing length being produced by pieces of apparatus such as rolling mills. However, as the length of the rod obtainable from a rolling mill has increased, it has been found that the rod length obtainable is limited by the means available to receive the rods from the mills. This is because it is customary and convenient to coil rods as they are discharged from a piece of apparatus such as a rolling mill, and because previously existing types of coiling apparatus are unsuited to coiling rods of great length.

Some of the previously existing types of coiling apparatus are unsuited to coiling rods of great length because they utilize a rotating member on which the rod is coiled as it is discharged from a rolling mill or the like and because as rod length increases, the rotation of both the rotating member and the relatively large weight of the rod on the rotating member becomes impractical. Those previously existing types of coiling apparatus by which the rod is coiled on or in a stationary member by a rotating member or other mechanism avoid this problem. However, these types of previously existing coiling apparatus have been limited in effectiveness and flexibility and have been cumbersome and characterized by relatively complicated mechanisms for positioning the rod on or in the stationary member.

Moreover, regardless of rod length, most previously existing types of coiling apparatus have been poorly suited to coiilng rods at the relatively high temperatures at which rods are produced by rolling mills and the like.

This is because they have normally coiled the rod at these relatively high temperatures and because the excessive flexibility of the rod at these temperatures causes snarling and tangling as the rod is coiled. It is also because they have not successfully prevented these temperatures from producing discoloration and other undesirable oxidation characteristics in the rod as it is coiled. Moreover, it is because the coil of rod provided by these previous types of coiling apparatus is at these relatively high temperatures and as a result, oxidation of the rod continues, the coil is so hot that it is hazardous to move, and the rod is so flexible that loops tend to slough to the bottom of a receptacle. Attempts to solve these problems by cooling the rod before it enters one of these previously existing types of coiling apparatus are unsatisfactory since they require the use of additional equipment between a rolling mill or the like and the coiling apparatus.

The present invention eliminates these and other problems associated with the coiling of the rod by providing apparatus for and a process of coiling rod by which the rod can be conveniently and efficiently coiled for subsequent feeding into a wire forming machine or other use regardless of the length of the rod and regardless of the temperature at which the rod enters the coiling apparatus.

The present invention provides a coil of rod of any desired length which does not tend to become snarled or tangled as or after it is coiled and which is cooled and ready to handle as it is coiled. In addition, when the rod is of an oxidizable metal such as copper, the rod in the coil obtained by the present invention is substantially free of discoloration resulting from oxidation of the rod in the air as and after it is coiled.

These improvements in the coiling of rod are provided by guiding the rod along an arcuate path from the remote end of which the rod is discharged downwardly into a cylindrical receptacle. The rod is cooled for improved coiling and protected from oxidation as it passes along the arcuate path and when discharged at the remote end of the arcuate path, it is sufficiently cooled to be handled manually, to be coiled without snarling and tangling resulting from excessive flexibility, and to not be readily discolored by oxidation.

As the rod is discharged at the remote end of the arcuate path, it coils within the cylindrical receptacle and by adjusting the distance from the cylindrical receptacle at which the rod is discharged from the arcuate path, the diameter of the convolutes of the coil of rod within the cylindrical receptacle may be easily and conveniently varied to produce sections of the coil which are deposited on successively positioned false bottoms on which the coil rests. This arrangement and the cooled condition of the coil are such that any tendency for the inner loops of the coil to slough to the bottom of the cylindrical receptacle is substantially eliminated. When one cylindrical receptacle is filled, the rod may be continued by leading the rod from the first cylindrical receptacle to a second cylindrical receptacle.

Accordingly, it is an object of the present invention to provide apparatus for and a process of coiling rod, the apparatus being inexpensive to manufacture, durable in structure, and efficient in operation.

Another object of the present invention is to provide apparatus for and a process of coiling a heated rod in which the heated rod is cooled so as to improve coiling and the quality of the rod.

Another object of the present invention is to provide apparatus for and a process of coiling rod in which the rod is cooled by a prescribed amount and wherein the amount of cooling of the rod may be readily and easily varied.

Another object of the present invention is to provide apparatus for and a process of coiling rod wherein the diameter of the convolutes in the coils produced by the apparatus may be easily and conveniently varied as desired.

Another object of the present invention is to provide an apparatus for coiling rod which will feed and coil the rod at a prescribed rate.

Another object of the present invention is to provide a process by which rods of any selected length may be inexpensively and efficiently coiled.

Another object of the present invention is to provide an inexpensive cooling mechanism for operation in conjunction with a coiling mechanism, the cooling mechanism being inexpensive to manufacture, durable in structure and efficient in operation and being capable of feeding a coolant for surrounding the rod as the rod is fed along its path.

Other objects, features and advantages of the present invention will become apparent from the following description when taken in conjunction with the accompanying drawings wherein like characters of reference designate corresponding parts throughout the several views and wherein:

FIG. 1A is a side elevational view of the discharge end of a rolling mill to which is connected a portion of the coiling apparatus constructed in accordance with the present invention.

FIG. 1B is a side elevational view of the remaining portion of the coiling apparatus shown in FIG. 1A.

FIG. 2 is a cross-sectional view taken substantially along line 2—2 in FIG. 1A.

FIG. 3 is a cross-sectional view taken substantially along line 3—3 in FIG. 1B.

FIG. 4 is a fragmentary plan view of the end portion of the boom of the device shown in FIG. 1B.

FIG. 5 is a cross-sectional view taken substantially along line 5—5 in FIG. 1A.

FIG. 6 is an enlarged partially broken away side elevational view of a detail showing a portion of the apparatus shown in FIG. 1A.

FIG. 7 is an enlarged vertical sectional view of one of the coolant feeding mechanisms for feeding a liquid coolant into the conduit of the apparatus shown in FIG. 1A, and FIG. 1B.

FIG. 8 is an enlarged side elevational view of a block forming a portion of the coolant or liquid feeding mechanism shown in FIG. 7.

FIG. 9 is an enlarged vertical sectional view of one of the coolant removal mechanisms for discharging the liquid coolant from the conduit of the apparatus shown in FIG. 1A and FIG. 1B.

FIG. 10 is an enlarged side elevational view taken of a block forming a portion of the coolant or liquid removal mechanism shown in FIG. 9.

FIG. 11 is an enlarged front elevational view, partially broken away of a modified form of the discharge end of the apparatus shown in FIG. 1A and FIG. 1B.

FIG. 12 is a schematic side elevational view of the discharge end of the apparatus shown in FIGS. 1A and 1B as it begins feeding rod to a receptacle disposed therebeneath.

FIG. 13 is a view similar to FIG. 12 and showing the apparatus as it continues to feed rod to the receptacle.

FIG. 14 is a side elevational view of the receptacle shown in FIGS. 12 and 13 after the first temporary bottom has been installed in the receptacle.

FIG. 15 is a view similar to FIG. 14 and showing the receptacle after a second temporary bottom has been installed in the receptacle.

FIG. 16 is a side elevational view of a pair of receptacles such as those shown in FIGS. 12 through 15 and illustrating the substitution of an empty receptacle for a receptacle which has been filled with rod.

Referring now in detail to the embodiment chosen for the purpose of illustrating the present invention, it being understood that, in its broader aspects, the present invention is not limited to the exact details herein depicted; numeral 20 denotes a conventional rolling mill into which a bar of metal is fed for working and reduction in cross-section at spaced aligned die stations 22. Outwardly of the end of the rolling mill 20 is a frame like base which includes a plurality of upright legs, the inner pair of legs 34 being disposed in transverse alignment immediately adjacent the end of the rolling mill 20 and the outer pair of legs 35 being disposed in transverse alignment outwardly thereof. Spaced parallel longitudinal braces 18 extend between intermediate portions of legs 34 and 35, the braces 18 supporting, by their ends a plurality of spaced parallel transversely extending ribs 19. A motor supporting platform 36 is carried by a pair of ribs 19 while another rib 19′, provided with a central hole, supports a gear housing 52.

Above the platform 36 is a top frame comprising a pair of longitudinally extending bars 37 and a pair of transversely extending bars 38, bars 37 and 38 connecting the upper ends of the legs 34 and 35.

Mounted on the bars 37 in transverse alignment are a pair of upstanding brackets 39, provided with transversely aligned pivot pins, such as pin 40. A pair of outwardly converging arms 41 which form a cantilever boom, project from brackets 39, the pivot pins, such as pin 40, passing through the end portions of the arms 41. The arms 41 project outwardly and upwardly, as illustrated in FIGS. 1 and 2, the outer ends of the arms 41 coming together and being joined at an apex 42, as seen in FIG. 4.

Adjacent the brackets 39 and projecting upwardly from the bars 37 are a pair of upstanding stanchions 43, the upper ends of which are provided with pillow blocks 44, which journal a transversely extending sprocket shaft 45. A reinforcing bar 59 extends between the upper end portions of stanchions 43. Inwardly of the pillar blocks 44 on shaft 45 are a pair of sprockets 46, over which are passed a pair of link chains 47, the front portions of chains 47 projecting downwardly and forwardly. The front ends of chains 47 are connected to the arms 41, outwardly of the pins 40 for supporting, in cantilever fashion, arms 41. The other ends of the chains 47 are connected to a vertically movable transversely extending, travel bar 48 seen best in FIGS. 5 and 6. The travel bar 48 is provided at its ends with a pair of downwardly extending runners 49 which are respectively received in opposed, U-shaped or channel-shaped, vertically disposed tracks 50. The tracks 50 extend from the braces 18 upwardly and terminate at the longitudinally extending bars 37, immediately below and inwardly of the stanchions 43.

Projecting downwardly from the central portion of the travel bar 48, through gear housing 52 and the hole in rib 19′, and secured by its upper end to the travel bar 48 is an externally threaded shaft 51, seen in FIGS. 5 and 6. An internally threaded gear 53, rotatably carried by housing 52, threadedly engages the external threads of the shaft 51. The gear 53 is also provided with external teeth 54 which mesh with a worm gear 55 carried on a shaft 56. As seen in FIG. 5, the shaft 56 protrudes sidewise through the housing 52, being journalled appropriately, and is provided at its outer end with a pulley 57 driven by a belt 58 from a pulley 59 on a shaft 60 of motor 61. It will be understood that the motor 61 is carried by the platform 36 at a position adjacent the gear housing 52.

The gear 53, of course, is rotatably carried within the housing 52, while the housing 52 is firmly secured to the rib 19' so that, upon rotation of the shaft 56 by the motor 61 in either direction of rotation, the worm gear 55 will rotate the gear 53, thereby causing it to move the shaft 51 in a vertical path, either upwardly or downwardly, depending upon the direction of rotation of the shaft 56. Since the chains 47, which pass over the sprockets 46, are secured to the travel bar 48 and the travel bar 48, in turn, is secured to the shaft 51, the movement of the shaft 51 in its vertical path will cause a raising or lowering of the cantilever supported boom, defined by the arms 41.

Through appropriate wiring, the control of motor 61 may be located at any position remote from the motor 61. We prefer to locate a control box 62 on the end of a cable 63 which is carried by the arms 41 of the boom and projects from the apex 42 as illustrated in FIG. 1B. In this way, the height of the boom or arms 41 may be controlled by an operator standing at the outer end of the machine.

As best seen in FIG. 1 and in FIG. 6, the rod 25 is fed from the end of the rolling mill 20 into a central hole or trumpet 64 in a pivoted block 65 carried by the opposed pins 40 of the brackets 39. The block 65 is, therefore, pivotally mounted along a transverse axis so that it may pivot about a common axis with the arms 41. The trumpet or hole 64 in block 65 is belled out, opening toward the end of the rolling mill 20, so that the rod 25 is guided by the converging portion of hole 64 into the narrow portion of the hole or trumpet 64. The hole 64, on its other side, is counterbored and receives the end of an intermediate S-shaped guide tube or conduit 66 which is carried by and between the arms 41. The tube 66 includes a plurality of tandem arranged pipes 66a, 66b, 66c, 66d and 66e and extends in essentially a horizontal direction from the block 65 and then along a gradually upwardly arcuate path below the inner portion of the arms 41, and thence between and finally above an intermediate portion of the arms 41, the tube, i.e. pipes 66c and 66e, being carried by appropriate straps, including a pair of upstanding straps 67, as seen in FIGS. 1A and 2. The lower ends of the straps 67 are secured to the upper surface of the arms 41 while the upper ends of the straps 67 are secured to a sleeve 68 which carries the pipe 66e. Thence, the tube 66, i.e. pipe 66e, as seen in FIG. 1B, curves gently toward the boom to terminate projecting essentially horizontally outwardly above a platform 70 mounted on brackets 71 and 71a on the arms 41.

The platform 70, as best seen in FIG. 1B and FIG. 3, supports a pair of motors 72 and 73, of a feed means for urging the rod 25 out of the tube 66 and into the discharge tube 77, the shafts of motors 72 and 73 projecting transversely in opposite directions, one above the other, above and below the path of travel of rod 25. The shaft of motor 72, which is below the shaft of motor 73, carries a roller 74 provided with a semicircular outwardly opening peripheral groove 75. The shaft motor 73 carries a resilient pressure or pinch roller 76 which urges the rod 25, as it emerges from the tube 66, against and into the upper peripheral portion of groove 75. The motors 72 and 73 are hydraulic motors driven by hydraulic fluid fed thereto by appropriate hydraulic lines (not shown) so that the peripheral speed of the inner portion of the groove 75 corresponds to the peripheral speed of the resilient roller 76. Thus, the rod 25, which is firmly grasped between the roller 76 and the roller 74, is withdrawn from tube 66 and urged toward the end or the apex 42 of the boom.

It will be understood that the motors 72 and 73 are driven at a speed commensurate with the speed at which the rod 25 is discharged from the rolling mill 20 and the speed of the motors 72 and 73 may be varied, as desired.

If the metal from which rod 25 is formed is a hard metal and/or light metal, such as aluminum, it may be found unnecessary to use rollers 74 and 76 for pulling the rod 25 from the S-shaped tube 66 and for inserting the rod 25 into tube 77. On the other hand, if the metal from which rod 25 is formed, is copper or some other relatively soft metal, the rollers 74 and 76 should be employed since these metals are too soft and too heavy to be pushed any appreciable distance through tubes 66 and 77 from the rolling mill 20. It is preferable that the rollers 74 and 76 be located at the position tangential with the adjacent end portion of tube 66 and also tangential with the adjacent end portion of tube 77. In this way, the rollers 74 and 76 do not deform the rod 25 to any appreciable extent. The rod 25 is fed from rollers 74 and 76 into the mouth of a parabolically shaped discharge tube 77 which is carried by the arms 41 at a position spaced inwardly from but adjacent the apex 42. The discharge tube 77 extends in an arcuate path outwardly and downwardly from an essentially horizontal position above the arms 41 and adjacent the rollers 75 and 76 to a substantially vertical position extending generally downwardly but terminating above the floor or surface on which the mechanism rests. Since discharge end 78 of the tube 77 is a substantially straight segment which projects essentially downwardly, the rod 25 is discharged from end 78 in a generally downwardly direction.

Referring now specifically to FIGS. 7 and 8, a typical coolant or liquid feeding mechanism such as mechanism 32 includes a pair of abutting juxtaposed, cylindrical blocks 80 and 81 which are coaxially disposed and provided along their inner surfaces with opposed abutting peripheral flanges 82 and 83. Suitably aligned holes radially spaced around the flanges, such as holes 84, permits bolts (not shown) to secure the flanges in abutting fashion.

Inwardly of the flanges 82 and 83, the abutting faces of blocks 80 and 81 are provided with opposed sidewise opening annular recesses 85 and 86 which define an annular cavity in the blocks 80 and 81. A pipe or pipes 87 protrude through the blocks 80 and 81 for supplying liquid coolant to the annular cavity defined by the opposed recesses 85 and 86.

The inner cylindrical wall 88 of recess 85 protrudes beyond the plane of the surface of flange 83 and terminates within the confines of the recess 86 in spaced relationship to the annular surface 89 of recess 86. Thence, the surface of block 81 tapers toward the central portion of the block 81 to provide a conical inwardly converging wall 90 which merges with a cylindrical wall 91. Wall 91 is coaxial with a complementary wall 95 of block 80 to define a central passageway which communicates with the adjacent end portions of the pipes 66b and 66c which are received respectively in the outer sides of blocks 80 and 81.

The block 80, inwardly of annular wall 89, is provided with a tapered wall 92 spaced from but paralleling wall 90, the walls 90 and 92 defining, therebetween, an inwardly and axially directed frusto-conical passageway from the annular cavity, formed by recesses 86 and 85, to the central passageway defined by the inner walls 91 and 95 for directing liquid coolant from the annular cavity to the central passageway in the direction of pipe 66b as indicated by the curved arrows in FIG. 7.

It will be seen in FIG. 7 that the wall 95, as it approaches block 81, flares outwardly to provide a trumpet effect so as not to impede the easy passage of rod 25 through mechanism 32 from pipe 66b to pipe 66c.

Referring now to FIGS. 9 and 10, the coolant removal mechanism 33, like the coolant feeding mechanism 32 includes a pair of cylindrical blocks 180 and 181 the inner sides of which abut each other along vertical faces or surfaces. The blocks 180 and 181 are provided complementary annular peripheral flanges 182 and 183 which are in registry with each other, the flanges 182 and 183 being provided with aligned radially spaced holes 184 through which bolts (not shown) are passed for securing the two flanges 182 and 183 in abutting or contiguous relationship. Like the preceding coolant feeding mechanism 32, the blocks 180 and 181, inwardly of the flanges 182 and 183, are provided with opposed recesses 185 and 186 which together, form an annular cavity surrounding concentrically the central passageway 91 of the mechanism 33. Discharge pipe 187, passing through the flanges 182 and 183, communicate with the annular cavity, formed by the recesses 185 and 186, and form a means by which liquid in the annular cavity is removed therefrom.

Extending between the central passageway 91 of the mechanism 33 and the annular cavity defined by recesses 185 and 186, are a pair of conically shaped spaced passageways 189 and 190, the passageway 191 being defined by the inwardly tapered conical wall of the block 181 and a frusto-conical intermediate block 192. The passageway 189 is defined by an outwardly tapered wall of block 180 and a wall of the intermediate block 192. For carrying the block 192 in spaced relationship to the walls of the blocks 180 and 181, a plurality of radially spaced veins 193, seen in FIGS. 9 and 10, extend between the walls defining recess 185 and the periphery of block 192.

The central passageway 91 extends through the blocks 180, 181 and 192, the blocks 180 and 181 being provided with counterbores which receive, respectively, the ends of the adjacent pipes 66a and 66b. The liquid, which is fed into the pipe 66b by the liquid feeding mechanism 32 will be removed by the liquid removal mechanism 33 as it emerges from the end of pipe 66b. Any excess liquid will flow from the pipe 66b through pipe 66c, and be caught as it emerges from the mouth of pipe 66a by a suitable catch basin (not shown).

It will be understood that the drawings of FIGS. 7, 8, 9 and 10 are intended to be representative of the various liquid feeding mechanisms 32 and liquid removal mechanisms 33 which are utilized in pairs on the tube 66.

In other words, as seen in FIG. 1A, between pipe 66b and pipe 66c is one liquid feeding mechanism 32, and between pipe 66d and 66c is a second and identical liquid feeding mechanism 32, both of which feed liquid to the tube 66 in a direction opposite to the direction of feeding of rod 25 therethrough. Furthermore, between pipe 66a and pipe 66b is one liquid removal mechanism 33 and between pipe 66c and pipe 66d is a second liquid removal mechanism 33. Of course, the number of liquid feeding mechanisms 32 and liquid removal mechanisms 33 may be increased or decreased for tube 66, if desired.

In order to cause a mechanism 32, as illustrated in FIG. 7, to feed in the direction of the feed of rod 25, it need only be rotated 180 degrees so that, for example, pipe 66b may be connected to block 80 while pipe 66c may be connected to block 81. In like manner, the mechanism 33 is rotated 180 degrees from the position shown in FIG. 9 so that the pipe 66a may be connected to block 180 and the pipe 66b connected to block 181.

It will be understood by those skilled in the art that all pipes 87 of mechanism 32 are connected by suitable conduits (not shown) to a source of liquid coolant under pressure and that, likewise all pipes 187 are connected by suitable conduits (not shown) to a liquid discharge system. If desired, the liquid received from mechanisms 33 may be cooled and recirculated in a conventional manner.

Referring now to FIG. 11, it may be found desirable, in some instances, to provide a stationary support for the discharge tube 77 of FIG. 1B in place of arms 41 and the mechanism for raising and lowering the arms 41. In such instances, it is still necessary to raise and lower the effective mouth of such a tube so as to vary the diameter of the convolutes of the rod as the rod is discharged. In the embodiment of FIG. 11, a mechanism for varying the effective mouth of a discharge tube is illustrated as including a discharge tube 277 which is similar to the discharge tube 77 of FIG. 1B. The end position of tube 277 extends vertically and terminates in a mouth 278 at its lower end. It will be understood that, except for the movable boom of the mechanism in FIG. 1A and FIG. 1B, the apparatus which feeds rod 25 to the tube 277 is substantially identical to the apparatus illustrated in FIG. 1A and FIG. 1B. Therefore, rod 25, which has been cooled, is fed to the discharge tube 277 and thence through mouth 278 to a suitable receptacle (not shown) disposed therebelow.

For varying the diameter of the coil formed in the receptacle (not shown) disposed below the mouth 278 of tube 277, an axially movable sleeve 279 is provided surrounding the end portion of tube 277 and its mouth 278. Normally, the sleeve 279 protrudes well beyond the mouth 278 and terminates in a downwardly opening mouth 290. A radial arm 291 on the sleeve 279 provides a means by which the axial position of the sleeve 279 may be varied to thereby vary the height of the effective mouth 290 of the tube 277. For this purpose, a hydraulic cylinder 292 is provided, on the tube 277, the cylinder being preferably a double acting cylinder controlled by hydraulic fluid fed through hydraulic lines 293 and 294 from a control valve 295. When fluid is introduced, from a supply tube 296 by the valve 295 and the tube 293, a piston rod 297 which is pivotally connected to the arm 291, extends the sleeve 279. On the other hand, when the valve 295 is adjusted so as to feed the hydraulic fluid through tube 294 from tube 296, the piston rod 297 is retracted, thereby retracting the sleeve 279. It is now seen that upon manipulation of the valve 295, the sleeve 279 may be positioned in any one of a plurality of positions axially with respect to tube 277 and that this position may be varied, as desired, so as to vary the height of the effective mouth 290 above the receptacle (not shown).

In FIGS. 1B, 12, 13, 14 and 15, a suitable receptacle 300 is illustrated for receiving the rod 25 as it is fed from the mouth 78 of tube 77 (or the effective mouth 290 of tube 277). This receptacle 300 is a right cylindrical wire frame member having a circular bottom 301 and an annular top 302 connected by radially spaced uprights 303. Thus, the receptacle 300 is open at its top, the uprights 303 defining a circular or cylindrical cavity for the receipt of the rod 25.

Between the top 302 and the bottom 301 are a plurality of vertically spaced spacer rings 304 which pass around the outside of all uprights 303 and are secured thereto. The rings 304 are parallel to each other and to bottom 301. The rings 304 are for establishing the positions of the temporarily created false bottoms, as will be explained hereinafter. If desired, the bottom 301 of the receptacle 300 may be provided with casters 315 which are swivelly mounted at appropriate places such as at the corners of the bottom 301. In this way, the casters 315 provide a ready means for transporting the receptacle 300.

*Operation*

From the foregoing description, the operation of the present device should be apparent. The cooling tube 66 is a smooth, S-shaped or ogee-shaped, continuously curved member which feeds tangentially to a parabolically curved discharge tube 77 so that the tube 66 and the tube 77 provide a tubular means for guiding a rod 25 along a path terminating in a substantially straight vertical segment. Thus, throughout the travel of the rod 25 in tubes 66 and 77, the rod is continuously curved or bent from its path, thereby preventing any rattling of the rod within the tube.

The rod, as it emerges from a hot-forming means such as the rolling mill 20 at a relatively high temperature, is fed into the substantially enclosed cooling zone defined by the S-shaped tube 66 where the liquid feeding mechanisms 32 of the tube 66 spray liquid coolant in conical paths onto the surface of rod 25. The rate of flow of the liquid coolant in the cooling means provided by the cooling zones may be regulated so that the rod is relatively cool as it emerges from the tube 77 and has a flexibility which is such that changing the position of the mouth 78 of the tube 77 changes the diameters of convolutions of the rod 25 as described below. For example a temperature of 200 degrees F. is easily obtained and at such a temperature, the rod 25 may be handled by gloved personnel, as may be found necessary. Moreover, at this temperature, rods of metals, such as copper, do not readily oxidize and become discolored by exposure to air.

As the rod 25 is fed from mouth 78, it is led to one lower peripheral corner portion of the receptacle 300 and is directed by hand in a circular path adjacent the uprights 303, as illustrated in FIGS. 12 and 13. If the rod 25, as it is fed from the tube 77, does not lie adjacent the uprights 303 so as to create a circular convolute or a plurality of convolutions of maximum diameter, as defined by the inner walls of uprights 303, the tube 77 is raised by the manipulation of the boom or arms 41 through operation of the switch or control 62. After several convolutions of rod have been laid into the bottom portion of the receptacle 300, the tube 77 and its mouth 78 are lowered by the lowering of the boom defined by the arms 41. This lowering, as the rod 25 is fed at an essentially uniform rate, causes the rod 25 as it is received in the receptacle 300 to create smaller convolutions in the same plane of reference with the convolutions having the maximum diameter of the receptacle 300. Thus, it is seen that, through suitable manipulation of the height of the mouth 78 through actuation and deactuation of the control means provided by the control 62 so as to alternately increase and decrease the distance between the mouth 78 and each plane of reference in which rod is coiled, a suitable first coil layer 312 is produced about a vertical axis parallel or coinciding with the axis of receptacle 300 and of tube 77 at the mouth 78 and having a height equal to or slightly less than the height of the first ring 304 above bottom 301. Next, a plurality of spacer bars or rods 310 are inserted over the first or lowermost spacer ring 304 in the receptacle 300. Each spacer bar 310 is a straight cylindrical bar or rod having a T-shaped or transverse handle. The spacer bar 310 is sufficiently long for the bar 310 to lie diametrically across ring 304 so that the end portions thereof rest on diametrically opposed portions of the supporting ring 304. As seen in FIG. 14, it is preferable to provide at least two spacer bars 310 which intersect in perpendicular fashion to create a false bottom or a temporary bottom against which a second layer coil 311 may be produced. After the false bottom is created, the coiling is continued in each of a plurality of new planes of reference so as to produce a second coil layer 311 in the manner in which the first coil layer 312, is produced, the two layers 311 and 312 being integrally connected in end to end fashion. As the second coil layer 311 is completed, a second set of two or more bars 310 are inserted over the next higher ring 304 in the manner previously described to create a second false bottom, spaced from the first false bottom, the height thereof being defined by the second spacer ring 304. The coiling is then continued so as to produce a third coil layer 313.

It will be understood that, once a coil layer, such as layers 311 and 313, is produced, the coil layer is sufficiently stable that the bars 310 which support that particular coil layer may be removed therefrom to drop the layer onto the next lower layer. Therefore, it is entirely suitable, after each coil layer, such as layers 311 and 313 is produced, to remove the bars 310 from the ring 304 which supports the bars 310 and reinserted the same on the ring 304 thereabove.

After the first receptacle 300 is filled with coils 311, 312 and 313 of rod 25, the first receptacle 300 is removed and a second empty receptacle 300 is substituted in its place. At this time, the rod 25, as illustrated in FIG. 16, is led from the top of the coil 313 carried by the first receptacle 300 into the bottom of the second receptacle, and the coiling operation is repeated in the manner previously described. As a complete coil is produced in the second receptacle 300, the rod 25 may be led from the second receptacle 300 to a third receptacle 300, etc.

It is, thus, seen that a relatively shiny cooled substantially continuous rod 25 is produced according to the present process. After a sufficient number of the receptacles 300 have been filled with coils of rod 25 the rod may be cut and the various receptacles 300 transported in tandem fashion to a wire forming machine, the end of the rod 25 in the last-to-be-filled receptacle 300 is then fed into the machine and, thereafter, the coils of rod 25 in the receptacles 300 are sequentially uncoiled by the wire forming machine in the reverse fashion in which it was formed.

It will be obvious to those skilled in the art that many variations may be made in the embodiment here chosen for the purpose of illustrating the present invention without departing from the scope thereof as defined by the appended claims.

What is claimed as invention is:

1. In a process of coiling metal rod wherein the rod in a heated condition is discharged in a substantially horizontal path from a rolling mill, the steps of receiving said rod in a second horizontal path aligned with said first horizontal path, progressively cooling said rod in a first cooling zone as said rod is moved in said second horizontal path by directing liquid coolant along a portion of said second path axially with respect to said rod and then removing said liquid coolant from said second path, directing said rod in an arcuate and ascending third path outwardly and upwardly and then arcuately to a fourth and generally horizontal path above said first and second horizontal paths, progressively cooling said rod in a second cooling zone as said rod is ascending by directing liquid coolant along said ascending third path and then removing the liquid coolant from said ascending third path, progressively grasping said rod in said fourth path and urging the same in an outwardly direction while guiding said rod in an arcuate outwardly and downwardly direction in a last path for discharging the same in a generally downward direction, moving said rod by gravity from the end of said last path over a prescribed distance, confining said rod to a circular path having a vertical axis for producing convolutes of rod, and varying said prescribed distance to thereby vary the diameter of the convolutes being produced.

2. In a process of coiling metal rod wherein the rod in a heated condition is discharged in a substantially horizontal path from a rolling mill, the steps of receiving said rod in an arcuate and ascending first path extending outwardly and upwardly and then arcuately to a second and generally horizontal path above said first path, progressively cooling said rod in a first cooling zone as said rod is ascending by directing liquid coolant along said first path and then removing the liquid coolant from said first path, progressively grasping said rod in said second path and urging the same in an outward direction while guiding said rod in an arcuate outwardly and downwardly direction in a last path for discharging the same in a generally downward direction, thereafter moving said rod by gravity from the end of said last path over a prescribed distance, confining said rod to a circular path having a vertical axis for producing convolutes of rod while supporting said rod at a prescribed level, varying said prescribed distance to thereby vary the diameter of the convolutes being produced for creating a first layer of rod, and continuing the confining of said rod to a circular path while supporting the same at a position above said first layer of rod and while varying said prescribed distance for producing a second layer of rod above said first layer.

3. In an apparatus for coiling metal rod fed at an elevated temperature from the exit end of a rolling mill in essentially a horizontal path, a boom carried in cantilever fashion and extending outwardly and upwardly from a position near the exit end of said rolling mill, means for pivotally supporting one end of said boom at said position, an S-shaped cooling tube carried by said boom for receiving the rod as discharged from said rolling mill, said cooling tube extending in a curved path generally horizontally outwardly and then upwardly and then again generally horizontally from its entrance end to its exit end, a curved discharge tube carried by said boom and having an entrance end and a discharge end, the entrance end of said discharge tube being disposed for receiving the rod discharged from the exit end of said cooling tube, liquid injection means carried by said cooling tube for injecting liquid coolant into said cooling tube for surrounding said rod and for moving axially along said tube, and means carried by said cooling tube for receiving said liquid coolant from said cooling tube, said discharge tube being so curved that it discharges said rod from its discharge end in a generally downward direction.

4. Apparatus for coiling metal rod fed at an elevated temperature from the exit end of a rolling mill in essentially a horizontal path comprising a boom carried in cantilever fashion and extending outwardly and upwardly from a position near the exit end of said mill, means for pivotally supporting one end of said boom at said position, an S-shaped first tube carried by said boom and having an entrance end generally aligned with and disposed adjacent the exit end of said rolling mill for receiving the rod as said rod is discharged from said rolling mill and having an exit end, said first tube extending in a curved path generally horizontally outwardly and then upwardly and then again generally horizontally from its entrance end to its exit end, a curved parabolic shaped discharge tube carried by said boom and having an entrance end and a discharge end, the entrance end of said discharge tube being disposed for receiving the rod discharged from the exit end of said first tube, feed means carried by said boom and disposed between the exit end of said intermediate tube and the entrance end of said discharge tube for urging said rod out of said first tube and into said first tube and into said discharge tube, fluid injection means carried by said first tube for injecting fluid coolant in a conical path into said first tube for surrounding said rod, said injection means directing said fluid coolant within said first tube in a direction opposite the direction of movement of said rod therein, means carried by said first tube for removing said fluid coolant from said first tube, said discharge tube being so curved that it discharges said rod from its discharge end in a generally downward direction, and means for raising and lowering said boom for adjusting the height of the discharge end of said discharge tube.

5. In an apparatus for coiling metal rod fed along a prescribed path at an elevated temperature, a hollow conduit having an inlet end and an exit end and through which said rod is passed, a coolant feeding mechanism surrounding said rod and carried by said conduit for discharging cooling fluid in a conical path into said conduit and onto the surface of said rod, and means intermediate the ends of said rod for removing the fluid from said conduit.

6. In an apparatus for coiling metal rod fed along a prescribed path at an elevated temperature, a conduit comprising a plurality of tandem arranged pipes, and a plurality of spaced mechanisms disposed between the ends of said pipes for circulating fluid coolant therein, said mechanisms each including a pair of juxtaposed blocks connecting the ends of adjacent pipes, said blocks defining a central passageway aligned with and communicating with said pipes and through which said metal rod passes, said blocks also defining an annular passageway surrounding said central passageway and a conical passageway extending between said central passageway and said annular passageway, means for introducing liquid coolant into the annular passageways of certain of said mechanisms, means for removing liquid from the annular passageways of certain other of said mechanisms, the conical passageways of said certain of said mechanisms respectively extending inwardly and toward said certain other of said mechanisms.

7. In a process of coiling rod as it passes from a hot-forming means along a substantially horizontal path, directing said rod through a coolant and from said horizontal path into a substantially vertical path, releasing said rod from said vertical path at a point spaced from a support surface by a vertical distance, and alternately increasing and decreasing said distance so as to increase and decrease the diameters of convolutions of said rod in a layer of convolutions supported by said support surface.

8. In an apparatus for coiling a rod about an axis in a plurality of convolutions of varying diameters in a plane of reference substantially perpendicular to said axis, tubular means for guiding a hot rod from a hot-forming means along a path terminating in a substantially straight segment which is parallel to said axis and which is spaced from said plane of reference by a vertical distance, control means for alternately increasing and decreasing said distance of said segment from said plane of reference, and cooling means for cooling said rod in said path so that said rod has a flexibility between said segment and said plane of reference which is such that increasing said distance of said segment from said plane of reference increases the diameters of convolutions of said rod in said plane of reference and decreasing said distance of said segment from said plane of reference decreases the diameters of convolutions of said rod in said plane of reference.

9. The apparatus of claim 8 in which said path is an arcuate path.

10. The apparatus of claim 8 in which said rod enters said path from a hot-forming means at a first temperature and in which said cooling means cools said rod in said path from said first temperature to a lower second temperature at which there is no substantial oxidation of said rod by air.

11. The apparatus of claim 8 in which said cooling means substantially encloses said rod as said rod traverses said path.

12. The apparatus of claim 8 in which said cooling means includes block means having a central passageway through which said rod passes, an annular passageway surrounding said central passageway and having a cooling fluid therein, and a conical passageway extending between said central passageway and said annular passageway.

13. The apparatus of claim 8 in which said cooling means includes a pair of juxtaposed blocks having abutting surfaces, said blocks being provided with opposed complimentary annular recesses which define an annular passageway having a cooling fluid therein, said blocks having respectively central passageways aligned with each other and through which said rod passes, and said blocks being respectively provided with opposed conical walls defining a conical passageway interconnecting said annular recesses and said central passageways.

14. The apparatus of claim 8 in which said rod is fed from a rolling mill in a generally horizontal path and in which said tubular means includes a guide member for directing said rod in a curvilinear path upward above the plane of said horizontal path and then downwardly in a perpendicular path, said guide means having a discharge end through which said rod is discharged in a generally downwardly direction toward a supporting surface on which said rod is coiled.

15. The apparatus of claim 8 including a flat circular bottom, a plurality of spaced parallel uprights extending perpendicularly from the peripheral portion of said bottom for defining a cylindrical cavity within said receptacle, an annular top joining the ends of said uprights, a plurality of support rings joining intermediate portions of said uprights, said support rings being disposed in planes one above the other and parallel to said bottom and a pair of bars selectively supportable by said rings for creating a false bottom defined by the level of the ring which supports said bars, said bars being angularly disposed with respect to each other when producing said false bottom, the distance between said rings and said bottom being such that said bars when supported by the lowermost ring will define a space between said bars and said bottom for the receipt of a first layer of convolutes of rod having a height of from four to eight inches and when being supported by a ring above said lowermost ring will define a space between said first layer and said bars for the receipt therebetween of a second layer of convolutes of rod comparable in size to the size of said first layer.

16. The apparatus of claim 8 in which said cooling means cools said rod in said path by passing said rod through a liquid coolant.

17. The apparatus of claim 16 in which said liquid coolant is moving in a direction opposite to the direction of motion of said rod in said path.

18. The apparatus of claim 8 including a receptacle having a fixed bottom positioned to define said plane of reference.

19. The apparatus of claim 18 in which said plane of reference is a first plane of reference and including bar means for forming a removable bottom in said receptacle spaced from said fixed bottom, said removable bottom being positioned to define a second plane of reference spaced from said segment by said distance.

20. The apparatus of claim 18 in which said segment is substantially vertical and in which said receptacle is cylindrical and concentric about a vertical axis substantially coinciding with the centerline of said rod within said segment.

21. The apparatus of claim 20 in which said receptacle is one of a plurality of receptacles alternately positionable under said segment.

References Cited

UNITED STATES PATENTS

| | | | |
|---|---|---|---|
| 2,863,557 | 12/1958 | Munker | 72—342 X |
| 2,900,073 | 8/1959 | Blake et al. | 72—66 |
| 2,997,249 | 8/1961 | Meinshausen | 242—82 |
| 3,143,314 | 8/1964 | Bosco | 242—83 |
| 3,145,832 | 8/1964 | Case | 72—43 X |
| Re. 26,052 | 6/1966 | Crum | 140—2 |

JOSEPH SCOVRONEK, *Primary Examiner.*